United States Patent [19]

Chak

[11] Patent Number: 4,769,120

[45] Date of Patent: Sep. 6, 1988

[54] DEVICE FOR SILVERIZING WATER, AND ELECTRODE FOR THE DEVICE

[76] Inventor: Maryan Chak, 2901 Ocean Parkway #C4, Brooklyn, N.Y. 11235

[21] Appl. No.: 134,163

[22] Filed: Dec. 16, 1987

[51] Int. Cl.$^4$ .................. C25B 9/00; C25B 11/03; C25B 11/08

[52] U.S. Cl. .................. 204/269; 204/275; 204/284; 204/292

[58] Field of Search .............. 204/269, 275, 284, 292

[56] References Cited

U.S. PATENT DOCUMENTS 1,906,914  5/1933  Mason ........................ 204/269
3,751,351  8/1973  Zankowski .................. 204/275 X
3,840,455  10/1974  Cooley et al. .............. 204/275 X
4,175,026  11/1979  Houseman .................... 204/292 X
4,675,254  6/1987  Shuster et al. .............. 204/275 X

*Primary Examiner*—Donald R. Valentine
*Attorney, Agent, or Firm*—Ilya Zborovsky

[57] ABSTRACT

A device for silverizing running water and an electrode therefor are formed so that the electrode has a curved guide provided on its one surface and a plurality of through-going openings located outside of the curved guide, to direct water to be silverized from inside of the curved guide to its outside and then through the openings.

8 Claims, 1 Drawing Sheet

DEVICE FOR SILVERIZING WATER, AND ELECTRODE FOR THE DEVICE

BACKGROUND OF THE INVENTION

The present invention relates to a device for silverizing water and an electrode for a silverizing device.

Devices of the above mentioned general type are known in the art. The known silverizing device includes a plurality of positive electrodes and a plurality of negative electrodes alternatingly arranged in a housing provided with inlet and outlet for water. During running of water through the device, silver ions produced by positive electrodes saturate the running water. The electrodes are formed with different shapes and designs to provide a sufficient path of water for its saturation with a required quantity of positive ions of silver. There are further requirements to increase the path of water flowing near and through the electrodes so as to further increases the efficiency of the device for silverizing water.

SUMMARY OF THE INVENTION

Accordingly, it is an object of the present invention to provide a device for silverizing water and an electrode therefor, which insures a significant path of flow of water near the electrodes to provide efficient saturation of the electrodes with positive ions of silver.

In keeping with these objects and with others which will become apparent hereinafter, one feature of the present invention resides, briefly stated, in a device for silverizing water and in an electrode in which one surface of the electrode is provided with a curved guide, and through-going openings are arranged outside of the curved guide, so that water flows inside the curved guide, is guided by the curved guide to outside of the guide, and then passes through the openings toward a next electrode.

The electrodes can be arranged over one another so that their curved guides extend in the same direction, or they extend in two opposite directions to further make longer the path of water and time of its contact with the electrodes.

The novel features of the present invention are set forth in particular in the appended claims. The invention itself, however, both as to its construction and its manner of operation, will be best understood from the following description of preferred embodiments which is accompanied by the following drawings.

DESCRIPTION OF PREFERRED EMBODIMENTS

Figure 1:
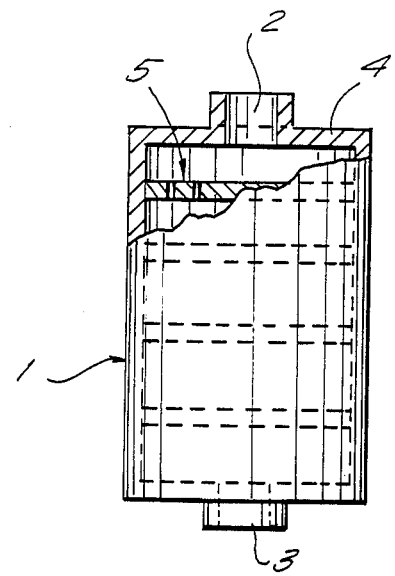
FIG. 1 is a view showing a device for silverizing water as a whole.

As shown in FIG. 1, a device for silverizing running water has a housing 1 which is provided with an inlet 2 and an outlet 3, and has an inner chamber 4. A plurality of electrodes 5 are arranged in the chamber 4 one above the other and have through-going openings.

When the device is attached to a water source for example a faucet by its inlet 2, and the electrodes 5 are supplied with respective current to provide alternatingly arranged positive electrodes and negative electrodes (of which the positive electrodes are silver-containing), water flows over and through the electrodes, is saturated by positive ions of silver produced by the positive electrodes, and issues through the outlet 2. The faucet and the current supply are not shown in the drawings for the sake of simplicity.

Figure 2A:
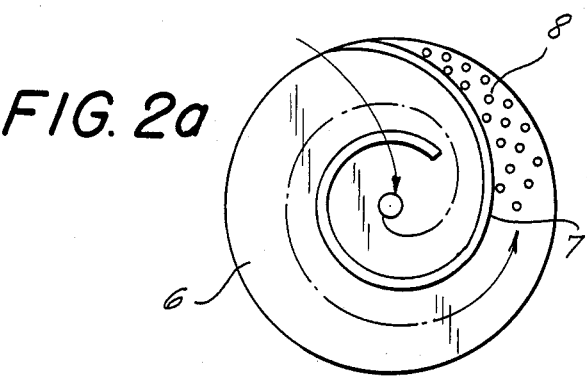
FIG. 2 is a view showing an electrode for a silverizing device in accordance with one embodiment of the invention.
Figure 2B:
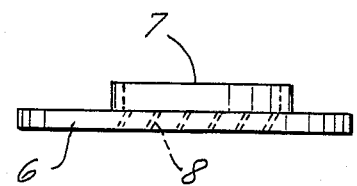

Each electrode in accordance with the present invention has a disc-shaped body 6 having two opposite surfaces. One of the surfaces of the body is provided with a curved guide 7 which in FIG. 2 is curved in a clockwise direction. Near its end which is located closer to a periphery of the body, a plurality of openings 8 are provided and extend through the body 6 of the electrode. These openings are located in a wedge-shaped surface portion which is limited by the curved guide 7. The curved guide is formed as a continuous uninterrupted member from its one end to its other end. As can be seen from FIG. 2, the through-going openings 8 can be inclined relative to the surfaces of the body of the electrode. The curved guide and the body can be formed as separate members connectable with one another or as a one-piece element.

When water supplied through the inlet 2 reaches the center of the first upper electrode, it is guided from inside of the curved guide 7 to outside of the curved guide, and then flows through the openings of the electrode downwardly to a lower electrode, then through the latter etc.

Figure 3:
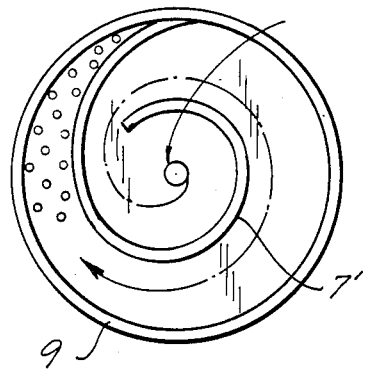
FIG. 3 is a view showing an electrode in accordance with another embodiment of the present invention.

As can be seen from FIG. 3, the electrode shown in this figure has a curved guide 7' which extends, contrary to the curved guide if FIG. 2, in a counterclockwise direction, with through-going openings 8' also formed outside the curved guide 7'. In the device for silverzing water in accordance with the present invention, identical electrodes can be arranged one above the other, for example only the electrodes shown in FIG. 2 or only the electrodes shown in FIG. 1. In these case the projections of the curved guides 7 or 7' of all electrodes on a common horizontal plane will coincide with one another. On the other hand, the electrodes can be arranged so that the electrodes with clockwise and counterclockwise curved paths are arranged alternatingly with one another. In the latter case, the path of flow of water to be silverized is even longer and therefore the time of contact of water with the electrodes is also longer.

Figure 4:
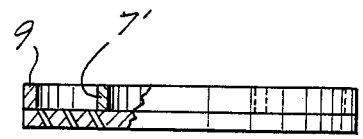
FIG. 4 is a view showing an electrode in accordance with still a further embodiment of the invention.

As shown in FIG. 2, the body of the electrodes can be formed as a flat disc. On the other hand, an additional peripheral wall 9 can extend upwardly from the same upper surface from which the curved guide 7 or 7' extend. While with the electrodes of FIG. 2 without the additional wall the wall of the housing 1 limits the inner chamber 4, with the electrodes of FIGS. 3 and 4 provided with the additional wall 9 the electrodes can just be directly installed on one another so that no housing wall is needed. The thusly formed electrodes can be connected by connecting means which are conventional and therefore and not shown in the drawings for the sake of simplicity. The wall portion which forms the curved guide 7' can be formed as a separate member, or on the other hand as a one-piece member with the additional wall 9.

The invention is not limited to the details shown since various modifications and structural changes are possible without departing in any way from the spirit of the present invention.

What is desired to be protected by Letters Patent is set forth in particular in the appended claims.

I claim:

1. A device for silverizing running water, comprising a housing having an inlet and an outlet for water and an inner chamber; and
a plurality of electrodes arranged in said chamber and including at least one silver-containing anode and at least one cathode arranged so that water running from said inlet to said outlet is guided by said electrodes and continuously saturated by positive ions of silver emerging from said anode, each of said electrodes having two opposite surfaces and being provided with a curved guide on one of said surfaces so that water which reaches said one surface is guided from inside of said curved guide to outside of said guide, each of said electrodes being also provided with a plurality of through-going openings arranged outside said guide so that water which has flown from inside of said guide to outside of said guide then flows through said openings of one of said electrodes toward said one surface of the other of said electrodes.

2. A device for silverizing water as defined in claim 1, wherein each of said electrodes has a peripheral edge and is provided at said peripheral edge with a peripherally closed wall which extends over a contour of said peripheral edge and is located outside said spiral guide at a distance from the latter.

3. A device for silverizing water as defined in claim 1, wherein said spiral guide of each of said electrodes is formed as a wall portion which raises upwardly from said one surface of each of said electrodes.

4. A device for silverizing water as defined in claim 1, wherein each of said electrodes has a center and a periphery, said spiral guide of each of said electrodes having a first end located closer to said center and a second end located closer to said periphery, said guide limiting a wedge-shaped surface portion on said one surface, said openings being located in said wedge-shaped surface portion.

5. A device for silverizing water as defined in claim 1, wherein said spiral guide of one of said electrodes and said spiral guide of another of said electrodes extend substantially in a same direction so that projections of both said guides of both said electrodes on a common horizontal plane substantially coincide with one another.

6. A device for silverizing water as defined in claim 1, wherein said spiral guide of one of said electrodes and said spiral guide of the other of said electrodes extends substantially in two opposite directions relative to one another.

7. A device for silverizing water as defined in claim 1, wherein said spiral guide of each of said electrodes has two ends spaced from one another and extends continuously between said two ends with no interruption.

8. An electrode for a device for silverizing running water, comprising
an electrode body having two opposite surfaces;
a curved guide provided on one of said surfaces so that when water to be silverized reached said one surfaces it is guided from inside of said curved guide to outside of said curved guide; and
a plurality of through-going openings arranged in said body outside said curved guide so that water which has flown from inside of said curved guide to outside of said curved guide then flows through said through-going openings of said electrode body.

* * * * *